United States Patent [19]

Fusco et al.

[11] 4,391,638

[45] Jul. 5, 1983

[54] METHOD FOR RECLAIMING INK WASTE

[75] Inventors: Gerard A. Fusco, North Brunswick; Glenn van Lier, Hillsborough, both of N.J.

[73] Assignee: J. M. Huber Corporation, Locust, N.J.

[21] Appl. No.: 370,884

[22] Filed: Apr. 22, 1982

[51] Int. Cl.³ .............................................. C09D 11/02
[52] U.S. Cl. ..................................... 106/20; 210/774; 210/781; 210/805
[58] Field of Search ........................ 210/702, 729–732, 210/767, 774, 781, 787–789, 805; 106/20, 28, 32; 162/5

[56] References Cited

U.S. PATENT DOCUMENTS 181,597  8/1876  Robertson ............................ 106/20

*Primary Examiner*—Ernest G. Therkorn
*Attorney, Agent, or Firm*—Alec H. Horn; Harold H. Flanders

[57] ABSTRACT

An improved method for reclaiming waste printing ink is provided wherein waste offset ink is diluted and, thereafter, free water and waste fibrous material is separated through specific gravity differential. A centrifugal method is provided to facilitate separation and to produce an easily disposable waste cake. A heating step is also provided to minimize the quantity of dilutant necessary to reduce fluid friction.

14 Claims, No Drawings

METHOD FOR RECLAIMING INK WASTE

BACKGROUND OF INVENTION

This invention relates to the reclamation of printing ink waste and more particularly to the removal of fibrous material from ink waste to produce an acceptable printing ink.

It is well known there are several methods of applying ink to paper to produce the written word. Two popular methods are "letterpress" and "offset" printing. Each method has its advantages and disadvantages and each utilizes a different type of ink.

In the letterpress process, an ink is applied to a raised character and the character is impressed against a surface to be printed, usually paper, and the imprint of the character is left upon the paper. The ink used in this process is of relatively low pigment concentration and is moderately fluid, having a viscosity similar to a light mineral oil.

Excess ink not transferred in the printing process is termed "waste" and is collected from the press. This waste ink typically contains paper fibers and other contaminants from the paper surface. Typically, this ink waste may be reclaimed by the mechanical filtration of the ink to remove the fibrous contaminants to again be acceptable for printing work.

The second method of printing, termed the offset process, utilizes three printing cylinders. A plate is clamped to a plate cylinder. In rotating, it comes in contact with a dampening roller and then an inking roller. The dampeners wet the plate with water or fountain solution so the non-printing area will repel ink. The inked image is then transferred to a rubber blanket on a blanket cylinder. Paper is printed as it passes between the blanket and impression cylinders. The excess ink not utilized in its printing process is removed and collected as waste. This waste ink contains water from the process in addition to large amounts of paper fiber and lint.

The ink used in this process, hereinafter termed "offset ink", is of a highly viscous or stiff nature and has twice the pigment content of a corresponding volume of letterpress ink. The offset ink does not flow and has a consistency similar to whipped cream. Because of the highly viscous nature of the ink and its corresponding low oil content, when waste fibers absorb oil from the ink the waste offset ink is rendered even more viscous. Further, water intimately mixed with the ink further adds to the thick, stiff, viscous nature of the waste ink. This waste ink cannot be conveniently filtered because of its viscous nature; moreover, the free water found in the waste ink is not capable of being removed by a filter.

Waste ink from the offset printing process is toxic and is traditionally considered a hazardous material rendering it expensive to dispose of safely. Further, printing fluids are rapidly becoming very expensive and economic necessity dictates their maximum utility. For these reasons, it has long been desired to recycle or reclaim this waste ink to be reused in the printing process or, at least, to render the offset ink waste nonhazardous to make its disposal more convenient and less expensive.

Many reclamation systems have been attempted but only two are utilized at all and none are satisfactory. Each system uses some form of agitation to reduce the waste ink viscosity as well as dilution with virgin ink. Thereafter, the waste ink is either strained or filtered by a convenient method.

One method may be referred to as a mechanical strainer. All waste offset is diluted with virgin ink and passed through a strainer. In general, 10 mesh strainers are used to remove gross contaminants and large pieces of paper. Virtually no entrained lint is removed. A 20 mesh strainer removes gross contaminants and up to 25% of the fiber present in the waste; however, finer strainers such as 40 and 60 mesh are ineffective due to rapid plugging with little improvement in fiber removal.

A second method of offset waste processing uses depth cartridge filters of various designs and micron sizes. These filters are designed to remove large quantities of contaminants compared to surface type strainers. In order to remove 90 to 95% of the fiber content which is necessary to produce a reclaimed ink product of useful quality, 50 micron cartridges would be needed.

Experience has indicated that approximately one to one-and-a-half cartridges are needed per gallon of waste ink clarified. This figure varies depending on pressure and type of cartridges, but these differences are not significant. Since the cost of cartridges vary from $1.50 to $2 per unit, the cost of reclaimed ink is $1.50 to $3 per gallon before considering the substantial cost of disposing of the ink sludge-filled cartridges. Disposal of ink-containing cartridges requires special handling procedures and is environmentally dangerous. Further, a disadvantage of both mechanical strainers and cartridge filters is that neither can remove entrained water from the waste offset.

The disadvantages of prior art are overcome by the present invention, however, and improved methods are provided for reclaiming offset printing waste to produce an acceptable offset printing ink.

SUMMARY OF THE INVENTION

In a preferred embodiment of the present invention, offset printing ink waste may be diluted with ink oil and heated to reduce the viscosity of the waste to reduce the resistance of the suspended paper fibers to movement within the waste. This reduced fluid friction permits the specific gravity differential between water, fiber and ink to be used to separate the contaminants from the ink. Therefore, the reduced viscosity ink mixture may be subjected to angular acceleration sufficient to separate the water and fibrous material contaminants from the ink mixture to produce a clarified ink mixture. After the clarified ink mixture is removed from the water and fiber, virgin ink is added to the clarified ink mixture to bring the mixture within acceptable offset printing ink specifications. A convenient method of applying the sufficiently high acceleration to the diluted ink mixture is by the use of a high speed centrifuge which produces an acceleration of approximately at least 12,000 times that of gravity.

Thereafter, the fibrous waste collected in the bowl of the centrifuge may be removed and discarded. Because of the preferential absorption of water over ink by the waste fibers, the waste fibers collected in the centrifuge bowl contain little or no ink but are soaked with captured water and may be disposed of without special consideration or environmental concern.

It is a feature of the present invention to remove free water and paper fiber from waste offset ink.

It is another feature of the present invention to remove at least 95% of the fiber from waste offset ink.

It is yet another feature of the present invention to obviate the need for special handling of offset ink waste product.

It is still yet another feature of the present invention to provide a reclaimed printable ink mixture capable of being upgraded into quality offset printing ink.

It is another feature of the present invention to provide a method of reclaiming waste ink contaminated with solid, fibrous impurities comprising diluting said waste ink with ink oil to form an ink mixture, heating said mixture until the viscosity of the mixture is reduced to a predetermined quantity, thereafter, subjecting said mixture to sufficient gravitational force to separate solid fibrous impurities from said ink mixture, and blending said mixture with sufficient virgin ink to produce an offset ink having a predetermined rheological property.

These and other features of the present invention will become apparent from the following detailed description.

DETAILED DESCRIPTION

The offset press operates on the principle of making one impression of each revolution of a cylinder. A printing cylinder, called the plate cylinder, is rotated to come in contact with a dampening roller which wets the plate so the nonprinting area will repel ink. Thereafter, it comes in contact with an inking roller. The inked image is then transferred to a rubber blanket on a blanket cylinder. Paper is printed as it passes between the blanket and impression cylinders.

Ink not transferred to the paper is considered excess and is removed from the process. This excess or waste ink contains lint and fibers from the paper which passes through the cylinders. Further, the waste ink contains substantial quantities of water or fountain solution used in the dampening phase of the offset printing process.

This waste ink varies from process to process but typically has a viscosity between 400 to 600 poise and contains between 0.2% to 0.5% paper fiber and lint by weight, or 4% by volume. Depending upon the process, approximately 10 to 15% of the ink consumed is removed as waste.

In order for offset ink reclamation to be practical, the clarified waste must have such a sufficiently high viscosity that a large quantity of virgin ink is not required to be added to produce an acceptable printing ink. Second, substantially 95% or better of the lint and fiber must be removed to produce an adequately clean product. Because waste comprises about 10 to 15% of the ink consumed and if a large quantity of virgin ink is needed to blend with the reclaimed ink, a printer may produce more finished ink product than he consumes in order to utilize all reclaimed waste ink.

For this reason, the clarified waste ink must come from the reclaimation process requiring only a four-to-one or, at most, a five-to-one blending ratio to be practical. Virgin ink has a viscosity of approximately 250 poise and if the clarified waste has a low viscosity, too much virgin ink is consumed in upgrading the reclaimed ink.

According to the present invention, it has been found convenient that as much "free water" be decanted from the waste before the ink waste is treated in order to efficiently remove water and lint from waste offset printing inks. Free water is that water which will separate from the waste ink upon standing. This removal of free water minimizes the amount of water needed to be removed in the separation stage.

It has also been found convenient to prescreen the waste prior to treatment according to the present invention to remove such gross contaminants as rags, cans, and large chunks of paper which may clog pipelines, damage pumps, or otherwise interfere with the smooth operation of the method of the present invention.

After the waste ink has had as much free water and gross contaminants removed as possible, the waste ink is mixed with ink oil under slow agitation to reduce the viscosity to a desired degree. Thereafter, the mixture of waste ink and oil, hereinafter referred to as the ink mixture, is sufficiently heated to reduce the viscosity of the ink mixture to such a degree that it may be passed through a centrifuge to separate the heavier lint and paper fiber from the lighter fraction of the ink mixture. A viscosity of around 50 to 60 poise has been found to be a convenient operating viscosity.

After the ink mixture has been sufficiently diluted and heated to achieve the desired viscosity, the ink mixture is passed through a zone of high annular acceleration to differentially separate the fiber, water, and clarified ink fraction. This is conveniently done by passing the ink mixture through a centrifuge which develops an acceleration of 12,000 to 13,000 times the force of gravity. The lighter clarified ink fraction is removed from the centrifuge and allowed to cool.

It of course may be seen that multiple vessels may be used in the pretreatment stage of the above-described process in order to utilize time most efficiently, and make maximum use of the minimum number of centrifuges needed to process a given amount of ink.

This clarified ink mixture fraction is thereafter blended with sufficient virgin ink to produce a final printing ink having sufficient viscosity and printing characteristics to meet a desired application. Because most printing applications do not require ink of the high rheological properties found in virgin ink, the blending ratio will vary from application to application depending upon the predetermined minimum specification for a desired application and the quality of the initial waste product. It of course should be understood that the greater the virgin ink to reclaimed ink ratio, the more ink product is produced due to the constant production of ink waste. However, at the other end of the scale, the less virgin ink added, the less expensive the final product and the lower the print characteristics specifications.

In applications where ink quality specifications are not too strenuous, such as newsprint, a very low virgin ink to reclaimed ink ratio is acceptable. Experience has indicated that beginning with a typical waste ink produced by newsprint and removing between 95 to 98% of the paper fiber, a blend of four parts virgin ink to one part reclaimed ink produces a printing ink of sufficient quality for all but the most demanding purposes. Further, depending upon the specifications acceptable to the user, ratios as low as three-to-one or even two-to-one may be adequate.

It is of importance to note that the solid waste fiber recovered from the centrifuge in the present invention is a firm cake of fibers containing little or no ink due to the preferential absorption of water by the fibers to the exclusion or partial exclusion of the ink. Therefore, this water soaked, solid waste may be disposed of without the need for many of the special handling requirements typically found with the disposal of environmentally hazardous waste ink sludge produced by the conventional filter cartridge. This substantially reduces the cost of disposal and renders the use of the above-described invention economically advantageous and environmentally desirable.

EXAMPLE 1

For illustrative purposes, the following reclamation method was performed on an offset ink waste from a newsprint press. Three barrels of ink waste were added to a settling tank and permitted to rest until the gross quantities of free water in the ink waste rose to the surface. This free water was siphoned off the surface to produce an ink waste with a reduced water content primarily from intimately dispersed water.

This de-watered waste contained approximately 0.5% lint and paper fiber by weight and had a viscosity of approximately 450 poise. This de-watered waste was pre-screened through a large mesh mechanical strainer to remove gross contaminants such as rags, cans and large chunks of paper to prevent clogging of lines and damage to pumps.

After prescreening, approximately 200 gallons of waste ink were placed in a metal pretreatment tank encircled with steam lines to permit convenient heating. Ink oil was added to the waste ink and slowly stirred until the viscosity of the mixture was reduced to approximately 125 poise. The pretreatment tank was then heated with the steam lines to approximately 160-180 degrees F. to further reduce the viscosity of the ink mixture to between 50 and 60 poise.

After this pretreatment, the ink mixture was passed through a centrifuge capable of angular acceleration greater than 12,000 times the force of gravity. Although other types of centrifuges may be adequate, the SHARPLES AS-16 super centrifuge and the SHARPLES AS-26 super centrifuge (available through Pennwalt Corporation, Warminster, Pa.) have proven particularly useful. Both centrifuges are capable of accelerations in excess of 12,000 g and have no internal obstructions to disrupt the smooth flow of the ink mixture.

The SHARPLES super centrifuge has a bowl in the form of a long thin cylinder rotating vertically in the machine. A motor spins the bowl at high speed to generate the high g forces necessary to the present invention. As waste ink is fed through the bottom of the cylinder, water and lint migrate to, and accumulate against, the sides of the bowl. Ink moves up through the middle and is discharged at the top of the bowl. Water and fiber removal is thus accomplished without the use of replacement filters.

The ink mixture was passed through the SHARPLES AS-16 super centrifuge at a rate of approximately 2 to 3 gallons per minute. Due to a bowl capacity in the centrifuge of approximately 0.7 gallon, the retention time at this flow rate is on the order of 14 to 21 seconds. This retention time was sufficient to remove between 95 and 98% of the fiber and lint from the ink mixture. It is of course understood that accelerations of greater than the approximately 12,000 g necessary to separate the fiber from the lighter fluid fraction would permit a concomitant decrease in retention time and a greater flow rate to achieve the same 95 to 98% fiber removal.

The ink mixture was passed through the centrifuge for approximately 25 minutes or until about 50 gallons of ink mixture had passed through the centrifuge. After this time, the bowl of the centrifuge had substantially filled with waste fiber cake and required cleaning. The flow of ink mixture was discontinued and the filter cake was removed and collected. This cleaning operation takes approximately 5 minutes on the SHARPLES AS-16 super centrifuge.

The flow of the ink mixture was resumed through the centrifuge and the above-described operation repeated until all of the ink mixture was passed through the centrifuge to have the fiber waste and water removed. After centrifuging, the clarified ink mixture was blended with virgin ink in a ratio of approximately 4 parts virgin ink to 1 part clarified reclaimed ink to produce an ink of approximately 240 poise with print qualities sufficient for almost any offset print use.

The waste fiber removed from the centrifuge bowl was examined and found to contain substantially no ink but was saturated with water removed from the offset waste. This absence of ink is believed due to the preferential absorption of water by the waste fibers to the exclusion of the ink and made for a fiber cake capable of being disposed of without the need for many of the special handling requirements necessary for environmentally hazardous wastes.

EXAMPLE 2

A second embodiment of the method of the present invention was performed on an offset ink waste from a newsprint press. The offset waste was dewatered and pre-screened as described in Example 1. Thereafter, approximately 200 gallons of waste ink were placed in a metal pretreatment tank and ink oil was added until the viscosity was reduced to approximately 30-30 poise. This ink mixture was passed through the centrifuge of Example 1 at room temperature to remove the waste fiber and the remaining free water to produce a clarified reclaimed ink. The ink reclaimed by this process was blended with virgin letterpress ink in a ratio of four to one to produce a high quality ink suitable for almost any letterpress print use.

As previously discussed, it is of course understood that the blending ratio of virgin ink to reclaimed ink is a function of the print rheological requirements of the user. Further, it must be understood that the volume of oil dilution, the optimum processing temperatures, and the ratio of virgin ink blended will also be a function of the ink waste characteristics and hence the performance of the ink on the press.

It is expected that with the utilization of a larger capacity, higher efficiency centrifuge such as the SHARPLES AS-26 super centrifuge, the run times between bowl cleanings may be extended and the flow rates increased. The exact duration of run and operation parameters must be determined under operating conditions to meet the individual requirement of the user, utilizing the teachings herein set forth.

It is, therefore, apparent from the foregoing that many other variations and modifications may be made in the structures and methods described herein without departing substantially from the essential concepts of the present invention. Accordingly, it should be clearly understood that the present and specific forms of the invention described herein and depicted in the example are exemplary only and are not intended as limitations in the scope of the present invention.

I claim:

1. A method for reclaiming waste ink contaminated with solid, fibrous impurities comprising,
   diluting said waste ink with ink oil to form an ink mixture;
   heating said mixture until the viscosity of said mixture is less than substantially 60 poise;

thereafter, subjecting said mixture to an angular acceleration sufficient to separate said solid, fibrous impurities from said ink mixture to produce a clarified ink; and blending with said clarified ink sufficient virgin ink to produce a printing ink having a predetermined rheological property.

2. The method of claim 1 wherein the viscosity of said ink mixture is reduced to substantially 125 poise with ink oil.

3. The method of claim 1 wherein said ink mixture is heated to between 160 degrees to 180 degrees F.

4. The method of claim 1 wherein said angular acceleration is greater than substantially 12,000 times the force of gravity.

5. The method of claim 1 wherein said virgin ink is blended with said clarified ink in a ratio of between 2 parts virgin ink to 1 part clarified ink and 5 parts virgin ink to 1 part clarified ink.

6. The method of claim 5 wherein said virgin ink is blended with said clarified ink in a ratio of substantially 4 parts virgin ink to 1 part clarified ink.

7. The method of claim 1 wherein said printing ink has a viscosity greater than substantially 200 poise.

8. A method for reclaiming waste ink contaminated with solid, fibrous impurities and water comprising, diluting said waste ink with ink oil to form an ink mixture having a viscosity less than substantially 125 poise;

heating said mixture to a temperature between substantially 160 degrees F. and 180 degrees F. to reduce the viscosity of said mixture sufficient to permit centrifical separation of said solid, fibrous impurities and water from said ink mixture;

subjecting said mixture to a centrifugal acceleration at least substantially 12,000 times the force of gravity to produce a clarified ink; and blending said clarified ink with sufficient virgin ink to produce a printing ink having a viscosity of greater than substantially 200 poise.

9. A method for reclaiming waste offset ink contaminated with solid, fibrous impurities, said method comprising, diluting said waste ink with ink oil to form an ink mixture having a viscosity substantially equal to virgin letterpress ink;

thereafter, subjecting said mixture to angular acceleration sufficient to separate said solid, fibrous impurities from said ink mixture to produce a clarified ink; and blending with said clarified ink sufficient virgin ink to produce a letterpress printing ink having a predetermined rheological property.

10. The method of claim 9 wherein the viscosity of said ink mixture is reduced to substantially 30 to 40 poise.

11. The method of claim 9 wherein said angular acceleration is substantially 12,000 times the force of gravity.

12. The method of claim 9 wherein said clarified ink is blended with virgin letterpress ink in a ratio of between 2 parts virgin ink to 1 part clarified ink and 5 parts virgin ink to 1 part clarified ink.

13. The method of claim 12 wherein said clarified ink is blended with virgin letterpress ink in a ratio of substantially 4 parts virgin ink to 1 part clarified ink.

14. The method of claim 9 wherein said letterpress printing ink has a viscosity of substantially 30 poise to 40 poise.

* * * * *

UNITED STATES PATENT AND TRADEMARK OFFICE
CERTIFICATE OF CORRECTION

PATENT NO. : 4,391,638
DATED : July 5, 1983
INVENTOR(S) : GERARD A. FUSCO and GLENN VAN LIER It is certified that error appears in the above—identified patent and that said Letters Patent is hereby corrected as shown below:

Column 1, line 6, following "particularly" insert -- relates --.

Column 1, line 65;

Column 3, line 43;

Column 3, line 55; and

Column 5, line 6; "reclaimation" should be -- reclamation --.

Column 4, line 11; following "and" insert -- ink --.

Column 4, line 20; "annular" should be -- angular --.

Column 6, line 29; "30-30" should be -- 30-40 --.

Signed and Sealed this

Eleventh Day of October 1983

[SEAL]

Attest:

GERALD J. MOSSINGHOFF

Attesting Officer     Commissioner of Patents and Trademarks